Dec. 12, 1944.  R. R. CURTIS  2,364,605
FUEL SYSTEM
Filed July 2, 1942  2 Sheets-Sheet 1
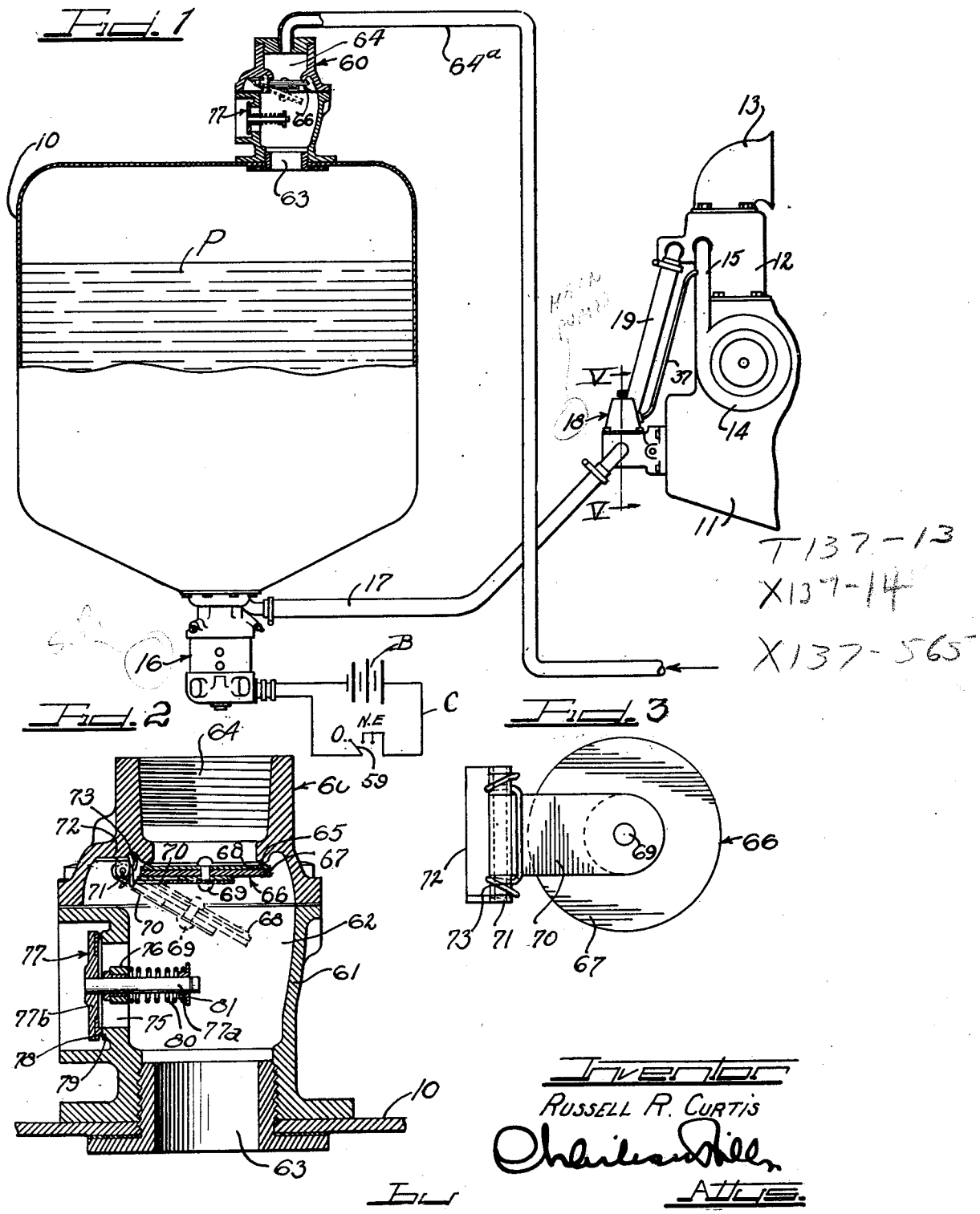
Inventor
RUSSELL R. CURTIS Dec. 12, 1944.   R. R. CURTIS   2,364,605
FUEL SYSTEM
Filed July 2, 1942   2 Sheets-Sheet 2
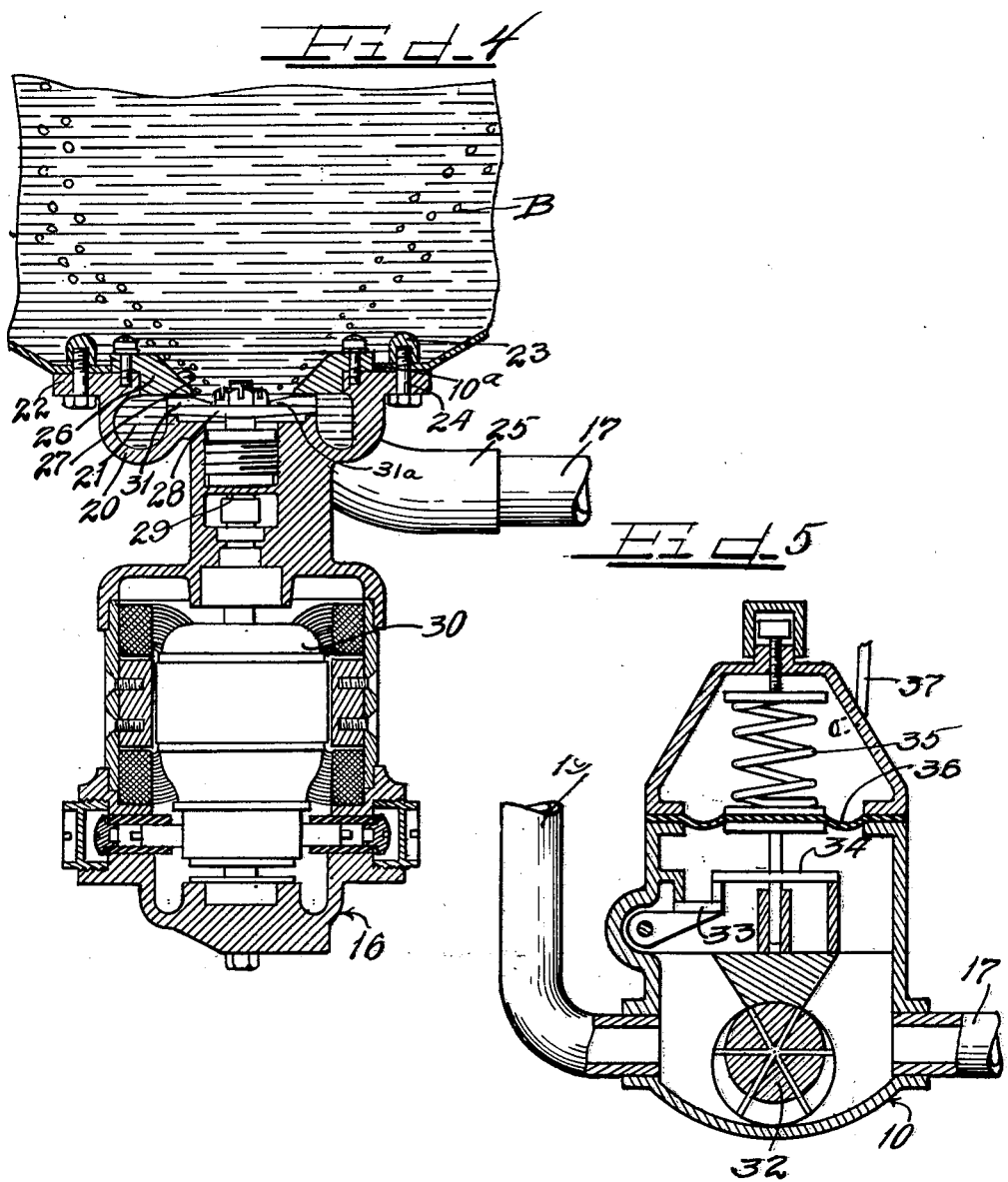
Inventor
Russell R. Curtis
by Charles Hill
Attys.

Patented Dec. 12, 1944

2,364,605

UNITED STATES PATENT OFFICE 2,364,605

FUEL SYSTEM

Russell R. Curtis, Dayton, Ohio, assignor to Curtis Pump Company, Dayton, Ohio, a corporation of Ohio Application July 2, 1942, Serial No. 449,422

7 Claims. (Cl. 158—36.3)

This invention relates to fuel systems, especially adapted for use in aircraft, which will prevent vapor lock and, at the same time, will eliminate excessive loss of volatiles from the fuel.

Specifically the invention relates to fuel systems having booster pumps for beating out bubbles of gas and vapor from the fuel and for pressurizing the bubble-freed fuel to the suction side of another pump, together with an automatically operating set of valves which will seal the fuel supplied to the booster pump from the ambient atmosphere unless the atmospheric pressure is greater than the pressure on the fuel and unless the pressure on the fuel exceeds a predetermined pressure differential.

Briefly, the fuel systems of this invention include tanks or other containers for voltaile fuel such as gasoline, booster pumps positioned at the lowest practical point on the tanks for beating out bubbles of gas and vapor from the fuel while pressuring the fully liquid fuel to the main fuel pump of engines, such as aircraft engines, to be driven by the fuel, devices for sealing the tanks when the pressures in the tanks are below a predetermined pressure differential above the ambient air pressure surrounding the tank, devices for automatically venting the tanks when the ambient air pressure is greater than the pressure in the tanks, and devices for relieving pressure in the tanks when the tank pressure exceeds the predetermined differential above the ambient air pressure.

The booster pump is provided with pumping means and agitating means. The agitating means act on the liquid fuel to beat out gases and vapors therefrom and to deliver fully liquid fuel to the pumping means. The pumping means, in turn, pressure this fully liquid fuel to the engine fuel pump. This fuel pump has a by-pass around the pumping element thereof so that the pressured fuel from the booster pump can be delivered direct to the engine carburetor in the event of failure of the fuel pump. In addition, the inlet and outlet of the booster pump are in constant communication so that the fuel pump can always receive fuel through the booster pump even though this booster pump fails or is not driven.

The tandem arrangement of booster and fuel pumps permits the flying of aircraft to very great altitudes without failure of the fuel system. The agitators of the booster pump will prevent gases and vapors from entering the fuel line, since they beat out the gases and vapors in bubble form and liberate the bubbles into the pond of gasoline contained in the tank. These bubbles will rise to the surface of the pond and burst to form a gaseous atmosphere above the pond which aids in increasing the head pressure on the fuel being fed to the booster pump. If the tank were vented, these gases and vapors would be lost through the tank vent.

In accordance with this invention the tank is sealed as long as the pressure on the fuel therein remains above the ambient air pressure and does not exceed a predetermined pressure differential above this ambient air pressure. In the event that the ambient air pressure exceeds the pressure in the tank, the tank will be automatically vented to the ambient air so that outside air pressure will be introduced to bring up the tank pressure at least to the outside air pressure. In the event that the tank pressure exceeds a predetermined pressure differential above the ambient air pressure, the tank will automatically be vented to bring the differential pressure down to the desired amount.

As aircraft is flown to very high altitudes, the pressure on fuel in a vented tank is materially reduced until an altitude is reached where the liquid fuel itself will start boiling or breaking up, causing an appreciable loss of desired lighter ends of the fuel through volatilization. By sealing the tank, the loss of such volatile is prevented and furthermore the fuel will not start boiling as quickly as in a vented tank because a pressure differential is maintained in the tank. However, in order to prevent development of bursting pressures in the tank, this invention provides for the automatic venting of the sealed tank whenever the pressure differential in the tank above the atmospheric pressure exceeds about four pounds per square inch.

As the aircraft dives from high altitudes to low altitutdes, it is possible that the atmospheric or ambient air pressure at the lower altitudes may be greater than the pressure in the tank. In such event, according to this invention, the tank is automatically vented to bleed in the atmosphere air at the higher pressure until equilibrium is reached, whereupon the tank is again automatically sealed.

The device for bleeding atmospheric air into the tank whenever the atmospheric air pressure is above the tank pressure, may conveniently take the form of a flap valve urged by a light spring to closed position, and maintained in closed position whenever the tank pressure exceeds the ambient air pressure. However, whenever the ambient air pressure exceeds the tank pressure, the flap valve will automatically open to permit bleeding in of air to the tank.

The device for venting the tank whenever the pressure differential therein exceeds four pounds per square inch may conveniently take the form of a small bleeder valve, spring urged to closed position and arranged to automatically open against the spring pressure whenever the pressure differential in the tank rises above four pounds per square inch.

Both the flap valve and the spring urged relief valve can be carried in a single housing conveniently mounted on the top wall or upper portion of the tank.

It is, then, an object of this invention to provide an improved fuel system which not only prevents development of vapor lock but also reduces loss of fuel through volatilization.

Another object of the invention is to provide a fuel system with a supply tank which is automatically sealed or vented in accordance with relative pressure conditions between the inside and outside of the tank.

A still further object of the invention is to provide a fuel system operating on a pressurized principle, which system, however, will not fail in the event of pressure failure.

A still further object of the invention is to provide an aircraft fuel system which is sealed from ambient air to maintain a predetermined pressure differential in the fuel tank and which is automatically vented to the ambient air whenever this predetermined differential pressure is varied.

A further specific object of the invention is to provide an aircraft fuel system of the booster pump-fuel pump type with an automatically operating device for maintaining a predetermined pressure differential on fuel being supplied to the booster pump.

Other and further objects of the invention will be apparent to those skilled in the art from the following detailed description of the annexed sheets of drawings which, by way of preferred example, only, illustrate one embodiment of the invention.

On the drawings:

Figure 1 is a somewhat diagrammatic side elevational view, with parts broken away and shown in vertical cross section, of a fuel system according to this invention.

Figure 2 is an enlarged vertical cross-sectional view of a combination tank seal valve and relief valve device on the top of the tank of Figure 1.

Figure 3 is a bottom plan view of the flap valve and spring mounting of the device of Figure 2.

Figure 4 is an enlarged vertical cross-sectional view of the booster pump and bottom portion of the tank shown in Figure 1.

Figure 5 is an enlarged vertical cross-sectional view of the engine fuel pump taken generally along the line V—V of Figure 1.

As shown on the drawings:

In Figure 1 the reference numeral 10 designates generally an airplane fuel tank containing a pond P of volatile fuel such as gasoline. The reference numeral 11 designates an airplane engine having a fuel and air mixing device such as a carburetor 12 for supplying fuel and air in proper admixture to the intake manifold 13 of the engine. A supercharger 14 can be provided on the engine 13 for supplying air under pressure through a discharge conduit 15 to the carburetor 12.

A booster pump 16 of the centrifugal type is suspended on the bottom of the tank 10 for preparing fully liquid fuel from the pond P and for pressuring this fully liquid fuel through a fuel line 17 to the suction side of the main fuel pump 18 of the aircraft engine 11. This main fuel pump 18 is usually driven by the aircraft engine and pressures fuel through a fuel line 19 into the carburetor 12.

As best shown in Figure 4, the booster pump 16 is composed of a casing 20 defining an annular pump volute chamber 21 and having an annular outturned mounting flange 22 for attaching the pump to the bottom wall of the tank 10. The tank 10 has an opening 10a through the bottom wall thereof and a mounting ring 23 is provided in the tank around the opening 10a. Mounting bolts or studs 24 extend through the mounting flange 22 into threaded engagement with the mounting ring 23 for suspending the pump assembly on the bottom wall of the tank.

The volute chamber 21 of the pump discharges into an outlet 25 receiving the fuel line 17.

A throat ring 26 is mounted in the opening 10a of the tank on the casing 20 and defines an outwardly flared inlet mouth 27 to the volute chamber 21. An impeller disk 28 spans the inlet mouth 27 and underlaps the throat ring 26. The impeller disk 28 is mounted on the drive shaft 29 of an electric motor 30 carried by the casing 20. The impeller disk 28 has upstanding curved vanes 31 thereof which are partially covered by and underlap the throat ring 26 and which also project inwardly as at 31a in uncovered communication with the opening 27. The portions of the vanes 31 which underlap the throat ring serve as pumping vanes to pressure the fuel into the volute chamber 21. The uncovered portions or inner ends of the vanes are in free communication with the pond of fuel P and serve as agitators or beaters to beat out bubbles B of gas and vapor from the liquid fuel so that only fully liquid fuel reaches the pumping vane portions and the fuel line 17 only receives pressured fully liquid fuel.

The bubbles B liberated by the agitating vane portions of the booster pump rise in an outward flaring path along the flaring inlet 27 and thence upwardly through the pond P to the top of the pond where they can burst at the surface of the pond.

As best shown in Figure 5, the main fuel pump 18 includes an offset rotor 32 of the sliding vane type preferably driven by the engine 11. Fuel received from the fuel line 17 is pressured by the rotor into the fuel line 19.

A by-pass valve 33 is provided to permit the flow of fuel through the pump 18 in the event of failure of the pump. This by-pass valve 33 can be opened by fuel pressure when the booster pump is operated at higher emergency speeds to increase the pressure of fuel in the line 17.

Since the inlet 27 of the booster pump is in constant communication with the volute chamber 21, and thus with the fuel line 17, fuel can be readily drawn through the booster pump by the main fuel pump 18 even though the motor 30 of the booster pump is not driven. Likewise, fuel can be by-passed around the pumping element of the main pump 18 in the event of failure of this pumping element.

A relief valve 34 is also provided in the main fuel pump 18. This valve is spring biased to closed position by means of an adjustable spring 35. A flexible diaphragm 36 bridges the pump housing to divide the same into upper and lower compartments with the lower compartment receiving the fuel therethrough and with the upper compartment being connected through a tube 37 to the discharge line 15 of the supercharger 14. The relief valve 34 allows excess fuel at the pressure selected by adjustment of the spring 35 to return from the discharge to the intake side of the pump 18. The diaphragm 36, by being subjected to fuel pressure on one side and supercharger pressure on the other side, automatically compensates for fluctuations in the air and fuel pressures. Thus, if the fuel pressure increases materially, fuel on the discharge side of the vane pump can be released back to the suction side of the pump.

A constant fuel pressure on the discharge side of the pump can thereby be maintained as long as the supercharger delivers a constant air pressure.

In accordance with this invention, and as best shown in Figures 1 and 2, a device 60 is mounted on top of the tank 10. This device 60, as best shown in Figure 2, comprises a housing 61 defining a chamber 62 with an inlet port 63 for communication with the interior of the tank 10. An outlet port 64 is also provided for communication with a vent pipe or tube 64a, as shown in Figure 1, communicating with the ambient air surrounding the aircraft.

A valve seat 65 is formed at the mouth of the outlet port in the chamber 62 and the port 64 is closed by a flap valve 66 seating on the seat 65. This flap valve 66 includes a metal disk or plate 67 carrying a sealing disk 68 on the top face thereof for sealing engagement with the seat 65. A stud or rivet 69 passes through the gasket 68 and flapper plate 67 into an arm 70 which is pivoted as at 71 to a support 72 secured in the top of the chamber 62.

A spring 73, better shown in Figure 3, holds the flapper valve 66 against the seat 65 so as to close the port 64. The spring 73 is rather weak and, whenever the pressure in the tank 10 is below the pressure in the port 64, the flapper valve will open to vent the tank to the line 64a. This will permit the bleeding in of air so as to bring the pressure in the tank up to the ambient air pressure.

The housing 61 also has a side port 75 with a spider extending thereacross and defining a bearing housing 76 through which the stem 77a of a pressure relief valve 77 can slide. This pressure relief valve 77 has a head 77b carrying a sealing gasket 78 adapted to seat on another housing seat 79 positioned on the outside of the housing 61. A spring 80 surrounds the stem 77a and acts between a retainer 81 on the valve stem 77a and the bearing housing 76 to hold the valve head 77b against the seat 79. However, when pressures in the tank 10 develop above a predetermined differential over the ambient air pressure the pressure in the chamber 62 will act on the valve head 77b through the port 75 to open the valve and relieve the pressure.

The flap valve 66 therefore is closed whenever the pressure in the tank 10 is at or above the ambient air pressure. The relief valve 77 is closed until the pressure differential in the tank rises above a predetermined pressure, such, as, for example, four pounds per square inch. The valve will then open to vent the excess pressure and prevent development of bursting pressures in the tank.

As shown in Figure 1, the electric motor for driving the booster pump 16 is energized from a battery B, or any other source of current, through a circuit C including a switch adapted to be moved to an off position O; a normal speed position N; and an emergency or high speed position E.

When the switch is in the N position, the booster pump will operate at normal speed for pressuring fuel into the main pump 18. However, if, for any purpose, the main pump 18 becomes inoperative, the booster pump can be speeded up by moving the switch to the emergency position E, whereupon fuel will be pressured by the booster pump alone through the by-pass 33 of the main pump 18 into the engine carburetor 12.

In normal operation of the fuel system, the booster pump is not used until altitudes are reached where a vapor lock condition may set in due to reduced pressures in the tank. Thus, as fuel is drawn from the pond P by the main fuel pump 18 the level of the pond will drop in the tank and a rarified atmosphere may develop above the pond. If this atmosphere is at less pressure than the ambient air pressure surrounding the tank, the flapper valve 66 will open to bleed in ambient air. However, if the ambient air pressure is also rarified, the fuel in the tank may start to boil or break up thereby tending to produce a vapor lock condition in the fuel line. Before such conditions arise, it is therefore desirable to start the booster pump into operation at normal speed for beating out any bubbles of gas and vapor from the fully liquid fuel. This will prevent vapor lock from developing in the fuel line.

The particular altitude at which it is desired to start operation of the booster pump will vary considerably, depending upon temperature of the fuel, nature of the fuel, rate of climb, and the like. Usually the booster pump should be started at altitudes around 10,000 feet so as to insure against development of vapor lock conditions.

When conditions are reached, at high altitudes, where the pressure in the tank is such that the fuel can boil, the vapor pressure created by the boiling fuel will, of course, be greater than the ambient air pressure and, since the flapepr valve will be closed, it is desirable to provide an automatic vent to prevent the development of excessive pressure. In accordance with this invention, upon development of pressures over four pounds per square inch in the tank above the atmospheric pressure, the relief valve 77 will open.

The tank 10 is therefore always sealed unless conditions arise in which it is desired to bleed air into the tank or vapors out of the tank. By maintaining the tank in closed condition the loss of the lighter ends of the fuel through volatilization is greatly minimized and, at the same time, the fuel system is not dependent, for proper functioning, upon maintenance of a sealed tank. If the tank should be punctured by bullet holes or the like, the system can continue to operate through the booster and fuel pumps with the only disadvantage being the loss of fuel through volatilization. In a simple pressurized fuel system, on the other hand, the tanks must be pressured at all times sufficiently to force fuel through the fuel line. In addition the tanks must be super-pressured to prevent "vapor lock" in the line because at high altitudes the differential pressure sufficient to force feed the fuel may not be sufficient to prevent boiling of fuel in the tanks.

The systems of this invention eliminate vapor lock at any pressure and therefore an airplane equipped with such a system can fly to higher altitudes with the same differential pressure on the tanks that would cause failure at much lower altitudes in a simple pressurized system.

In the event that the aircraft should dive from very high altitudes to low altitudes, and the atmospheric air pressure thereby become greater than the pressure in the tank, the flapper valve will automatically open to bring the tank pressure up to the atmospheric pressure. Alternatively, if the pressure in the tank should become too great, the relief valve will automatically open to bleed off excessive pressure. As a result, the tank construction can be relatively light in weight without sacrifice of operating efficiency.

In the systems of this invention, the fuel tank is sealed even when the aircraft is on the ground. It may be assumed, as it is in the industry now, that the maximum fuel temperature to be encountered is 110° F. If the aircraft directly climbs to altitude with a sealed tank of 110° F. fuel and the fuel is not being used from the tank, a four pounds per square inch differential pressure will first be reached at about 8000 feet. Since the relief valve 17 is set to open at this differential pressure, the tank will be vented, but the escape of vapor will be negligible because an 8000 foot altitude is well below the altitude at which actual active boiling of the fuel occurs.

The usual aviation fuel at the maximum expected temperature of 110° F. will start to boil actively in a fully vented tank at about 20,000 feet altitude. However, since the systems of this invention can retain a four pounds per square inch differential pressure, and since such a differential is about equivalent to the atmospheric pressure drop from 20,000 to 40,000 feet altitude, it follows that the escape of fuel vapor in these systems will not be appreciable until altitudes of approximately 40,000 feet are reached. This action, of course, will be modified if fuel is being drawn from the tank. Thus, due to reduced pressure at the inlet of the engine pump 18 resulting from resistance to flow presented by other units in the system such as strainers, fuel cocks and the like and from possible negative head pressure at this point, vapor may be first formed at this inlet below 40,000 feet altitude even though a four pounds per square inch differential pressure exists in the tank. Further, air coming out of solution with the fuel before the fuel starts boiling may carry vapor with it and cause vapor lock at altitudes less than 40,000 feet in the event the booster pump is not operating.

Therefore, depending upon the amount of fuel drained out and the gas leakage which might occur, the booster pump 16 might or might not have to be used before actual boiling of the fuel started. Thus it is possible that the booster pump might not be required until an altitude of about 30,000 feet has been reached.

It will, of course, be understood that various details of the invention may be varied through a wide range without departing from the principles of this invention and it is, therefore, not the purpose to limit the patent granted hereon otherwise than necessitated by the scope of the appended claims.

I claim as my invention:

1. In a fuel system adapted for high altitude aircraft performance, a fuel tank, a pump communicating with the lower portion of said tank for delivering fuel from the tank, agitating means on said pump in free communication with the interior of the tank for beating out bubbles of gas and vapor from the fuel before the fuel is trapped in the pump, a pair of valves communicating with the upper portion of said tank and adapted to vent the tank to the ambient air, spring means holding said valves in closed position, one of said valves being arranged to open whenever the ambient air pressure exceeds the pressure in the tank, and the other of said valves being arranged to open whenever the pressure differential between the interior and exterior of the tank exceeds a predetermined value.

2. In a fuel system adapted for high altitude aircraft performance, a sealed fuel tank, a booster pump for drawing fuel from said tank, agitating vanes on said pump in free communication with the interior of the tank positioned to act on the fuel before it is confined in the pump to liberate gas and vapor in bubble form to rise through the fuel in the tank, a casing mounted on the upper portion of said tank defining a chamber communicating with said tank, a flapper valve operatively mounted in said chamber, a vent port controlled by said flapper valve, spring means urging said flapper valve to closed position for closing said vent port, a second vent port communicating with the chamber in said casing, a relief valve slidably mounted in said port, spring means urging said relief valve to closed position for closing said second port, said flapper valve being arranged to open whenever ambient air pressure exceeds the pressure in the tank and said relief valve being arranged to open whenever the pressure in the tank exceeds about four pours per square inch above the ambient air pressure.

3. In a fuel system adapted for high altitude aircraft performance, a fuel tank, a booster pump having an inlet and an outlet communicating with said tank to place the tank in communication with the outlet even when the booster pump is idle, agitating means on said pump in free communication with the interior of the tank effective to direct bubbles of gas and vapor back to the tank before they become trapped in the pump, valves on the upper portion of said tank for sealing the tank, tank vents controlled by said valves, one of said valves being arranged to open whenever the ambient air pressure is above the pressure in the tank, and the other of said valves being arranged to open whenever the tank pressure increases beyond a predetermined maximum.

4. The method of delivering gasoline to an aircraft engine as the aircraft climbs to high altitudes which comprises pumping the gasoline from a sealed pond, beating out bubbles of gas and vapor from the gasoline immediately before pumping the same, directing the bubbles to rise through gasoline in the pond, bleeding ambient air onto the pond only when the pond pressure falls below the ambient air pressure, and relieving pressure from the pond only when the pond pressure exceeds about four pounds per square inch over the ambient air pressure.

5. In a fuel system adapted for high altitude aircraft performance, a fuel tank, a centrifugal booster pump communicating with the lower portion of the tank for delivering fuel from the tank, said booster pump having associated therewith means in free communication with the interior of the tank for directing bubbles of gas and vapor into the tank to rise in the fuel therein before the fuel is trapped in the pump, a first valve associated with the top portion of the tank for sealing the tank, said first valve adapted to be opened whenever ambient air pressure is greater than tank pressure for admitting ambient air to the interior of the tank to facilitate delivery of fuel from the tank by the pump, and a second valve associated with the top portion of the tank arranged to open whenever the tank pressure exceeds the ambient air pressure a predetermined amount for venting the interior of the tank to the ambient air and thereby allow the vapors and gases to be relieved from the tank.

6. The method of delivering fuel from a sealed pond to an engine which comprises pressuring the fuel from the pond, simultaneously agitating fuel in the pond before it becomes pressured to direct bubbles of gas and vapor into the pond for rising through the pond to burst at the surface, venting the pond to ambient air whenever the pressure on the pond falls below the ambient air pressure, and venting the pond to the ambient air whenever the pressure on the pond exceeds a predetermined differential pressure over ambient air pressure.

7. The method of delivering fuel from a sealed pond to an aircraft engine as the aircraft climbs to high altitudes which comprises pressuring the fuel out of the pond, simultaneously agitating fuel in the pond about to be pressured to flow bubbles of vapor and gas upwardly in the pond, allowing the bubbles to burst at the surface of the pond, relieving gases and vapors from acting on the pond whenever the pressure on the pond exceeds a predetermined differential above ambient air pressure, and bleeding ambient air onto the pond only when the pressure on the pond falls below the ambient air pressure.

RUSSELL R. CURTIS.